(12) United States Patent
Lee et al.

(10) Patent No.: US 10,044,680 B2
(45) Date of Patent: Aug. 7, 2018

(54) METHOD FOR HIDING RECEIVER'S ADDRESS FOR LINK LAYER IN GROUP COMMUNICATION

(71) Applicants: Woomin Lee, Seoul (KR); Mirim Ahn, Seoul (KR); Yonghyun Kim, Seoul (KR); Juyoub Kim, Seoul (KR); Yihyeong Kim, Seoul (KR); Taekyoung Kwon, Seoul (KR); Sangho Park, Seoul (KR)

(72) Inventors: Woomin Lee, Seoul (KR); Mirim Ahn, Seoul (KR); Yonghyun Kim, Seoul (KR); Juyoub Kim, Seoul (KR); Yihyeong Kim, Seoul (KR); Taekyoung Kwon, Seoul (KR); Sangho Park, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 148 days.

(21) Appl. No.: 15/137,051

(22) Filed: Apr. 25, 2016

(65) Prior Publication Data

US 2016/0315914 A1 Oct. 27, 2016

(30) Foreign Application Priority Data

Apr. 24, 2015 (KR) ........................ 10-2015-0058299

(51) Int. Cl.
*H04L 29/06* (2006.01)
*G06F 21/62* (2013.01)

(52) U.S. Cl.
CPC ...... *H04L 63/0414* (2013.01); *G06F 21/6263* (2013.01); *H04L 63/0421* (2013.01); *H04L 63/1441* (2013.01)

(58) Field of Classification Search
None
See application file for complete search history.

(56) References Cited

U.S. PATENT DOCUMENTS 8,464,334 B1 *  6/2013  Singhal ............... H04L 63/0414
                                                726/13
9,331,958 B2 *  5/2016  Lie ......................... H04L 49/25
(Continued)

*Primary Examiner* — Malcolm Cribbs
(74) *Attorney, Agent, or Firm* — Scully Scott Murphy and Presser

(57) ABSTRACT

The present invention relates to a receiver information hiding method of hiding receiver information of a message in a system including a transmitting terminal broadcasting the message and a multitude of receiving terminals receiving the message, and the method includes selecting by the transmitting terminal at least one receiving terminal that has to process the message from the plurality of terminals, transforming by the transmitting terminal address information regarding the selected at least one receiving terminal, generating by the transmitting terminal the message using the transformed address information and broadcasting the generated message, and determining by each of the plurality of receiving terminals whether or not the corresponding receiving terminal is included in the selected at least one receiving terminal using specific address information corresponding to each of the plurality of receiving terminals and the transformed address information, in response to the reception of the message, and selectively processing or ignoring the message according to the determination result.

8 Claims, 4 Drawing Sheets

(56) References Cited

U.S. PATENT DOCUMENTS

| | | | |
|---|---|---|---|
| 2003/0048806 A1* | 3/2003 | Haartsen | H04L 29/12009 370/475 |
| 2003/0212820 A1* | 11/2003 | deCarmo | H04L 12/403 709/238 |
| 2004/0187030 A1* | 9/2004 | Edney | H04L 12/2856 726/13 |
| 2010/0153706 A1* | 6/2010 | Haddad | H04L 63/0407 713/153 |
| 2010/0161747 A1* | 6/2010 | Rayan | G06F 21/6263 709/206 |
| 2014/0256262 A1* | 9/2014 | Park | H04L 63/0407 455/41.2 |
| 2014/0280998 A1* | 9/2014 | Richards | H04L 45/306 709/230 |

* cited by examiner

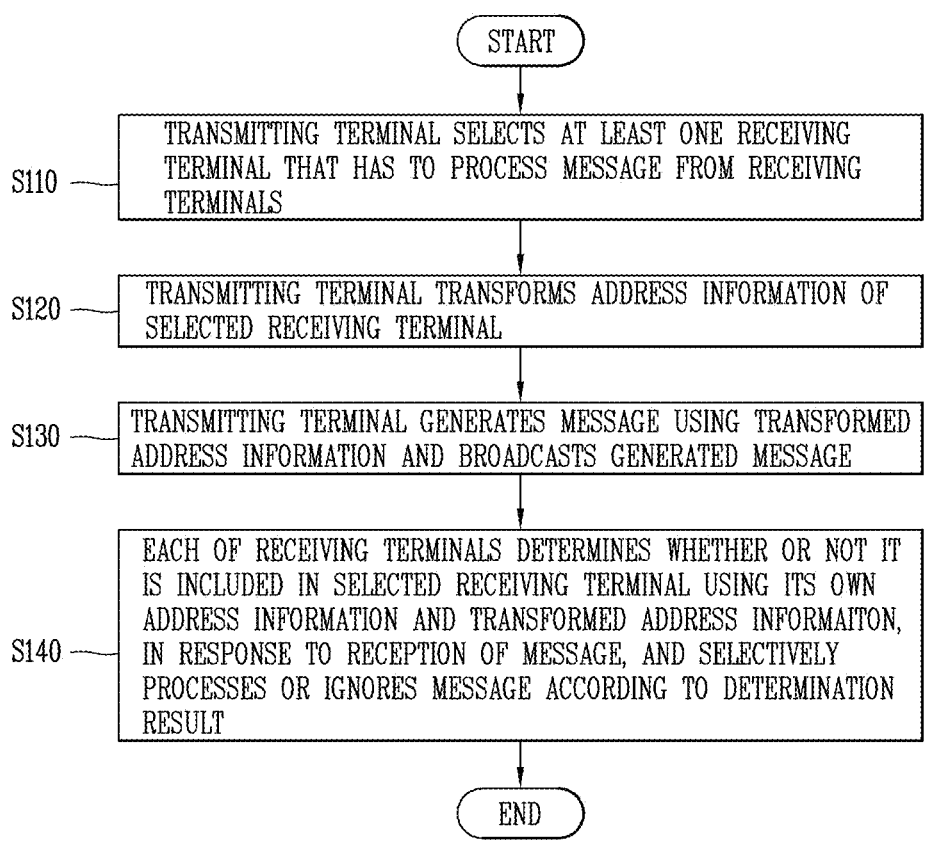
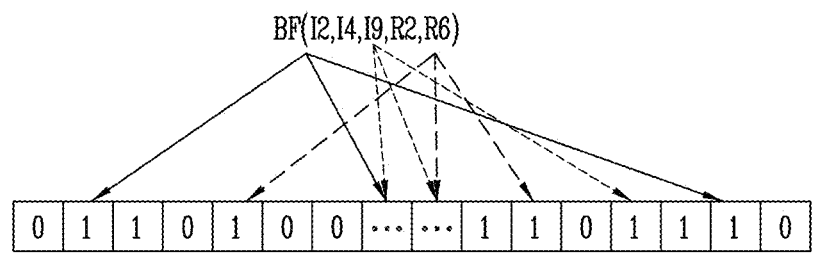

FIG. 4

ADDRESS = | 0 | 1 | 1 | 0 | 1 | 0 | 0 | ... | 1 | 1 | 0 | 1 | 1 | 1 | 0 |

| OCTETS : 2 | 1 | 0/2 | 0/2/8 | 0/2 | 0/2/8 | 0/5/8/10/14 | VARIABLE | 1 |
|---|---|---|---|---|---|---|---|---|
| FRAME CONTROL | SEQUENCE NUMBER | DESTINATION PAN IDENTIFIER | DESTINATION ADDRESS | SOURCE PAN IDENTIFIER | SOURCE ADDRESS | AUXILIARY SECURITY HEADER | FRAME PAYLOAD | FCS |
| | | | ADDRESSING FIELDS | | | | | |
| | | | MHR | | | | MAC PAYLOAD | MFR |

ZIGBEE LINK LAYER MESSAGE FORMAT

IDENTIFIABLE

UNIDENTIFIABLE

NUMBER OF 1s CAN BE SUPPOSED BASED ON NUMBER OF 1s

NUMBER OF 1s CANNOT BE SUPPOSED BASED ON NUMBER OF 1s

METHOD FOR HIDING RECEIVER'S ADDRESS FOR LINK LAYER IN GROUP COMMUNICATION

CROSS-REFERENCE TO RELATED APPLICATION

Pursuant to 35 U.S.C. § 119(a), this application claims the benefit of an earlier filing date of and the right of priority to Korean Application No. 10-2015-0058299, filed on Apr. 24, 2015, the contents of which are incorporated by reference herein in its entirety.

BACKGROUND OF THE INVENTION

1. Field of the Invention

This specification relates to a system including a transmitting terminal broadcasting a message, and a multitude of receiving terminals receiving the message, and more particularly, a system for including receiver information into the message and a method of hiding a receiver's address in the system.

2. Background of the Invention

In order to transmit and receive messages, receiver-specific information (an ID, a hardware value, an address, etc.) is needed. Such receiver information is input in a header part of a message, and accordingly it can be identified who is a receiver to receive the message.

However, a system attacker such as a hacker can see the specific information of the message receiver, and thus recognize a data flow within the system. If such information is collected for a long term of time, important information, such as a role of a terminal in a network and the like, may be likely to be exposed. Also, even though details of data communications cannot be known by hiding at upper layers such as an application layer and the like, a transmission of a message to a specific terminal can be recognized at a link layer. Therefore, anonymity at the link layer is required.

If receiver information itself is encrypted (encoded) to be hidden, either to take or to ignore a received message should be decided after decoding every message. This results in lowering a network performance.

Personal lives and anonymities of terminals connected to a network become more important issues, but the related technologies do not support or provide anonymities for message receivers at the link layer. Or, since the related technologies perform complicated operations based on mathematical operations and cryptography, they are inappropriate for terminals with low specifications.

SUMMARY OF THE INVENTION

Therefore, an aspect of the detailed description is to solve the aforementioned problems and other drawbacks.

Another aspect of the detailed description is to provide a system capable of preventing an attacker from knowing (recognizing) a receiver of a message by anonymizing receiver information within the message, and a method of hiding the receiver information in the system.

Another aspect of the detailed description is to provide a system capable of adding uncertainty with respect to receiver information within a message, and a method of hiding the receiver information in the system.

Another aspect of the detailed description relates to anonymity of a link layer, and is to provide a system capable of providing anonymity by hiding information related to a receiver which/who is to receive a control command when issuing the control command in a group communication, such as a wireless sensor network, an Internet of things, and the like, and a method of hiding the receiver information in the system.

To achieve these and other advantages and in accordance with the purpose of this specification, as embodied and broadly described herein, there is provided a system including a transmitting terminal broadcasting a message and a multitude of receiving terminals receiving the message, and a receiver information hiding method for hiding receiver information of the message in the system may include selecting by the transmitting terminal at least one receiving terminal that has to process the message from the plurality of terminals, transforming by the transmitting terminal address information regarding the selected at least one receiving terminal, generating by the transmitting terminal the message using the transformed address information and broadcasting the generated message, and determining by each of the plurality of receiving terminals whether or not the corresponding receiving terminal is included in the selected at least one receiving terminal using specific address information corresponding to each of the plurality of receiving terminals and the transformed address information, in response to the reception of the message, and selectively processing or ignoring the message according to the determination result.

In one exemplary embodiment of the present invention, the transforming by the transmitting terminal the address information regarding the selected at least one receiving terminal may include defining a function for transforming the address information regarding the selected at least receiving terminal, wherein the function is a function of generating a probabilistic data structure to determine whether or not a specific element is included in a predetermined set, and acquiring the transformed address information by inserting the address information regarding the selected at least one receiving terminal and at least one false address information into the function.

In one exemplary embodiment of the present invention, the transforming by the transmitting terminal the address information regarding the selected at least one receiving terminal may further include defining a plurality of false address information having different values, respectively, wherein the plurality of false address information are defined in a manner of avoiding duplication with address information corresponding to each of the plurality of receiving terminals, and randomly selecting at least one of the plurality of false address information. Also, the selected at least one false address information may be inserted into the function in the step of acquiring the transformed address information.

In one exemplary embodiment of the present invention, a number of the selected false address information may differ according to a number of the selected receiving terminal.

In one exemplary embodiment of the present invention, a size of the probabilistic data structure may differ according to a length of an address field defined in a data packet corresponding to the message.

In one exemplary embodiment of the present invention, a bloom filter may be generated by the function.

In one exemplary embodiment of the present invention, the processing or ignoring the message may include determining by each of the plurality of receiving terminals whether or not the corresponding receiving terminal is included in the selected receiving terminal, and processing by each of the plurality of receiving terminals the message when the corresponding receiving terminal is included in the selected receiving terminal, and ignoring the message when not included in the selected receiving terminal.

In one exemplary embodiment of the present invention, the address information regarding the selected receiving terminal may include at least one of a link layer address, and a specific serial number of the selected receiving terminal.

A receiver information hiding method in a system comprising a transmitting terminal broadcasting the message and a multitude of receiving terminals receiving the message, according to one exemplary embodiment of the present invention may include defining different true address information with respect to each of the plurality of receiving terminals, respectively, and false address information without being duplicated with the true address information, defining a function using the true address information and the false address information, wherein the function is a function of generating a probabilistic data structure to determine whether or not a specific element is included in a predetermined set, selecting at least one receiving terminal that has to receive the message from the plurality of receiving terminals, randomly selecting at least one false address information from the defined false address information, wherein a number of the selected false address information differs according to a number of the selected receiving terminal, generating receiver information of the message by inputting the true address information corresponding to the selected receiving terminal and the selected false address information into the function, and broadcasting the message using the generated receiver information.

A receiver information hiding method according to the present invention can provide the following effects.

According to at least one of embodiments of the present invention, a receiver can identify whether or not an address of a link layer, by which the corresponding receiver can be specified, is its own address, but an attacker cannot identify it. Also, a virtual receiver may further be included, which may allow for hiding a receiver of a message and a number of nodes receiving the message, and for providing security and anonymity at the link layer.

Also, since different receiver information is included in a different message transferred to the same receiver, a flow of messages cannot be identified by an attacker. A message through one-to-one communication and a message through one-to-many communication cannot be distinguished from each other, which can prevent an attacker from acquiring information based on the flow of messages on a network.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a flowchart illustrating a representative method of hiding receiver information in a system according to the present invention;

FIG. 3 is an exemplary view illustrating one embodiment employing the receiver information hiding method of FIG. 2;

FIG. 4 is an exemplary view of applying the receiver information hiding method of FIG. 2 to a ZigBee link layer message format;

DETAILED DESCRIPTION OF THE INVENTION

Figure 1:
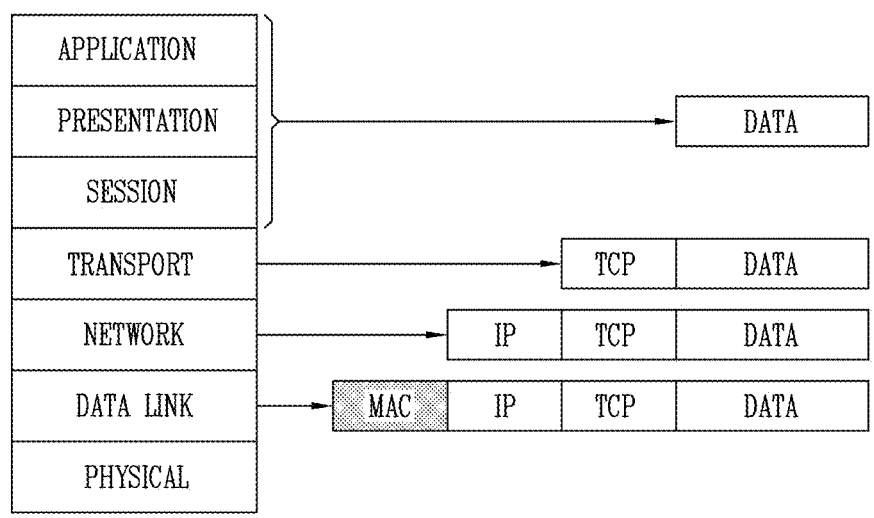
FIG. 1 is a view illustrating OSI 7 layers and a message structure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be duplicated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A system disclosed herein may include a transmitting terminal that broadcasts messages, and a multitude of receiving terminals that receive the messages.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

In information-oriented societies, various devices are connected together and exchange data. A message is transmitted according to an address which is set for each layer for data communications. FIG. 1 is a view illustrating OSI 7 layers and a message structure.

The message corresponds to data, which is used in an application program provided to a user, and a header for message transmission is added in front of the message for each layer. A general Internet environment uses TCP/IP and distinguishes a port and an address of a host. A wired/wireless LAN accesses a network interface of a terminal using a Media Access Control (MAC) address. A physical layer transmits a message using a wired electric signal or a wireless frequency. The data used may be configured in a form which is individually defined in a service or application program, and an ID may also be used or not be used in the data. Telnet, Hypertext Transfer Protocol (HTTP), File Transfer Protocol (FTP) and the like correspond to the widely-known applications and services. Transmission Control Protocol (TCP) and User DatagramProtocol (UDP) are the most widely known at a transport layer. They use port numbers in the range of 1 to 65535 together with the ID. Internet Protocol (IP), Internet Control Message Protocol (ICMP) and the like are used at a network layer. The network layer uses an ID which can be presented within a set range, such as 32 bits, 128 bits and the like.

Communication security is one of research fields which have been conducted for a long time, and there are various security technologies developed. An application layer freely defines and uses protocols and thus can use various encryption algorithms appropriate for service environments in a selecting manner. Secure Shell (SSH) is a security protocol which can substitute the Telnet, and Hypertext Transfer Protocol Secure (HTTPS) encrypts an HTTP message to safely protect it. Transport Layer Security/Secure Sockets Layer (TLS/SSL) is a protocol which is located between the transport layer and the application layer to protect a message of the application layer. The HTTPS operates on the TLS/SSL, and FTPS also encrypts an FTP message on the TLS/SSL for protection. Internet Protocol Security (IPsec) of the network layer performs authentication and protection with respect to an IP message. Layer 2 Tunneling Protocol (L2TP) of the link layer is used to protect a message at the link layer. Due to naturally poor security of the L2TP, L2TP/IPsec that the L2TP and the IPsec are combined with each other is generally used. Under a wireless LAN environment which is more vulnerable to wiretapping than a wired LAN, the link layer provides Wired Equivalent Privacy (WEP), Wi-Fi Protected Access (WPA) and the like to protect a message.

Various security methods which can be used on communication networks exist and are usefully used on wired communication networks. However, wireless communication networks which have different features from the wired communication networks are exposed to new security threats. In addition, by an increase in a number of terminals participating in communication, such as an introduction of an Internet of things, new problems to solve, such as an increase in IDs, an encryption key management load, and the like, are brought about, so a way to deal with such problems is required.

On the wired communication network, two terminals are connected in a one-to-one (1:1) corresponding manner at a physical layer and a link layer, except for a bus topology sharing a line. Anonymity at the link layer has not much meaning because a transmitter and a receiver of a message transferred through the corresponding line are definite. However, on the wireless communication network, a plurality of devices are connected to one channel and every message transmitted by a transmitter is received by every terminal at which electric waves have arrived. Also, unlike the wired communication network in which the transmitter should directly tap a line, every terminal having an antenna through which the corresponding channel can be received can receive a message on the wireless communication network, and thus the wireless communication network is vulnerable to a wiretapping attack. Message encryption and authentication technologies for preparing for the wiretapping attack are already used, but do not provide anonymity for a receiver address. For example, three peripheral devices are connected to a smart phone, a user does not have to recognize link layer addresses, and manages the devices through an application program which is generally associated with a management. Within the system, addresses of link layers of the peripheral devices are acquired during a connection establishment for a message transmission, and thereafter the message is transmitted using the acquired addresses.

Upon applying the conventional link layer security protocol, as shown in the drawing, a data part is encrypted, but a header part for the message transmission and reception is not encrypted. When even an address of a receiver is encrypted for security, every received message should be decoded to decide whether or not to receive the transmitted message, which greatly increases a load and is unpractical. Adequate attention has not been paid for anonymity at the link layer of the wireless communication network. However, as an application range of the wireless communication network is gradually expanding, in response to an introduction of the Internet of things and the like, the following problems are brought about.

Terminal information exposure: An address of a link layer generally includes a specific (or identification) number allocated for each manufacturer, and a serial number individually issued by the manufacturer. Upon acquiring a receiver address, manufacturer information can be known, and in some cases, even a type of product group may be open. Information related to a personal life such as medical devices, sports equipment and the like may be exposed.

Supposition of main terminal: An attacker who has performed wiretapping may acquire information related to a manufacturer and a product group from the address. When the product group provides more functions, it may be supposed as a main terminal, but it cannot be concluded that the corresponding product actually processes many services. Actually, a terminal that a user frequently uses causes much more data communications than a terminal that the user does not frequently use. The attacker may guess, on the basis of analysis results of wiretapped messages, that a terminal processing the greatest amount of packets plays the most important role.

Since a node relaying a message processes more packets, the attacker may guess the corresponding node as an important base node and try to attack the node. In addition, a wireless topology itself may be exposed, which may be fatal under a sensitive environment, such as a military network.

The data link layer is a layer performing a point-to-point transmission. The data link layer performs communications between neighboring devices, such as between a terminal and a router, between routers, and the like. Since the data link layer is the lowest layer of communication, it includes every data within a packet. That is, every data of the upper layers, namely, the network layer, the transport layer, the application layer and the like, is included in the packet of the data link layer. Therefore, when a data part of the packet of the data link layer is encrypted, the packets of the upper layers are all encrypted. Identification values such as addresses of the upper layers are also encrypted, and thus even a receiver as well as the data can be hidden from an attacker.

A network identifier such as an IP, a MAC address or the like, namely, an address is used to indicate information related to a transmitter and a receiver of a corresponding packet. Even though the data part is encrypted, if the receiver's ID is not hidden, the ID may be collected and used to analyze traffic. This may be more fatal to a military network, a surveillance reconnaissance wireless network and the like, from which communication network configuration information itself should be hidden. The attacker tries to acquire information regarding a network structure such as a routing path of a wireless network by analyzing the traffic. Also, if there are many packets heading for a specific address, a terminal using the corresponding address can be supposed as an important terminal processing many data. The important terminal may become a priority target of a denial of service attack, etc.

When even the ID of the link layer packet is encrypted, the terminal should decrypt the ID to recognize whether or not it is a receiver of the corresponding packet. In addition, since every packet is propagated through the air in a wireless environment, the terminal also receives every packet to which signals get. Attempting to decode every packet causes a overload, and specifically, is inappropriate under an environment, such as the Internet of things, to which a plurality of low-power/low-functional small wireless devices are connected. To be applied to such environment, a mechanism by which the terminal can fast inspect whether or not a packet received is its own packet while hiding the address of the link layer based on a bloom filter has been designed.

The receiver information hiding method of the system according to the present invention is divided into a preparation step of constructing a network, and a communication step. The receiver information hiding method according to the present invention may be efficiently applied to a group communication environment, such as a wireless sensor network or an Internet of things, in which a receiving terminal is designated at the beginning of constructing the system. That is, in an environment that a main terminal transmits a control message to at least one of preset sub terminals, the receiver information hiding method according to the present invention can be effectively applied.

Hereinafter, the preparation step will first be described of the preparation step and the communication step.

Pieces of true address information corresponding to the respective receiving terminals and pieces of false address information without being duplicated with the true address information are defined, respectively.

Here, address information refers to information for identifying a destination of a message, namely, a receiving terminal, and has a specific value without being duplicated. For example, the address information may be an address of a link layer, a MAC address, a terminal's own serial number or a combination thereof.

The true address information and the false address information are all examples of address information, and the terms 'true' and 'false' are used to distinguish the two. The true address information refers to address information corresponding to a really existing receiving terminal, and the false address information refers to address information corresponding to a non-existing virtual terminal.

The true address information is address information corresponding to one of the receiving terminals, and each receiving terminal has different true address information. For example, assuming that there are n receiving terminals, first true address information $I1$ to $n^{th}$ true address information $In$ are defined. Those pieces of true address information are defined without a mutually-duplicated value.

The false address information refers to non-existing virtual address information for hiding the true address information. The transmitting terminal defines a plurality of false address information in a manner of avoiding a duplicated value with those true address information of the receiving terminals. That is, the transmitting terminal defines the plurality of false address information having different values, respectively, and the plurality of false address information are not duplicated with the address information corresponding to the receiving terminals. For example, when there are m pieces of false address information defined, the plurality of false address information include first false address information $R0$ to $m^{th}$ false address information $Rm$.

Here, the values n and m may vary according to embodiments.

Next, a function for hiding receiver information included in a message is defined.

The function refers to a function of generating a probabilistic data structure to determine whether or not a specific element is included in a predetermined set. For example, the function may generate a boom filter.

In general, when performing a membership query for checking whether or not a certain element x is included in a certain data set A in a search system, a matching test should be carried out with respect to every element of the set A. When every element is stored in a memory as the number of elements x, namely, a size of the set A increases, this results in excessive use of the memory. Using a database or a file system takes longer time than using the memory.

The bloom filter provides results as 'True' or 'False' with respect to whether or not the element x is included. An error is not present when the result is 'False,' but is present when the result is 'True.' That is, a false positive that the corresponding element is not always included even though the result is 'True' is observed. When the result is 'False,' the corresponding element is certainly not included. An included element is precisely determined but additionally an error that a non-included element is determined as being included may be generated. In order for the false positive to belong to an allowable range, a size of the bloom filter, a number of hash functions and the like can be adjusted for use. That is, a space and a time which are available in the search system are traded off such that a false positive probability can be low enough to be allowable. In a system in which the false positive is not allowable, a non-existing element may be fast determined by using the bloom filter and thereafter the conventionally-used search method may be used only for an existing element so as to obtain a precise result. The bloom filter allows a faster search than a total inspection. Therefore, it is more advantageous to perform the search only with respect to elements detected as 'True' rather than every element. According to this characteristic, the bloom filter is sometimes used as an auxiliary means (or component) of a data search. When 'True' is obtained according to the search result, the existence or non-existence may be re-determined through a database inquiry and the like. When 'False' is obtained, the non-existence can be checked without an additional inquiry process.

The bloom filter uses a bit array v including m elements, and k independent hash functions h. Each of the hash functions should provide one of values from 0 to m−1 as a discrete logarithm distribution with respect to an input value. When storing a value in the bloom filter, the input value is hashed by the k functions, and a value '1' is written on each index corresponding to the hashed results. Upon searching for whether or not an element is included, the element is determined as included when the value '1' is obtained on each index of the results with respect to all of the k hash functions, and determined as not included when every index does not have the value '1.'

In case where a range of a number (n) of terminals is set, like in a wireless sensor network or an Internet of things within a personal space or home, the values m and k may be designated by considering an available capacity of a memory provided in a terminal and a calculation performance, respectively. To obtain the adequate values m and k, the available values m and k within an adequate range are all applied to search for a trade-off point using the false positive probability and the memory/power consumption in the terminal. A desktop environment or a device constructing a wired network is not subject to a high limit of performance and performs a link layer communication only with at least one adjacent terminal within a predetermined distance. Therefore, sizes of the values m and k are decided by considering the number of supportable terminals n.

The transmitting terminal may hide receiver information regarding a receiving terminal that has to receive the message using the function, and the receiving terminal may determine whether or not it is included as an element in a set of terminals having to receive the message. In more detail, the receiving terminal may determine whether or not it is included as the element using the function. Here, the determination as to whether the element is included (i.e., membership query) refers to determining whether or not an element x with respect to a certain set A has a relationship 'x∈A.' That is, the membership query refers to determining whether or not an arbitrary receiving terminal belongs to a set of receiving terminals having to receive the message.

The function includes a plurality of hash functions and generates the bloom filter. The transmitting terminal verifies the false positive of the function using the true address information In of the receiving terminals and the false address information Rm. When the false positive is generated, the transmitting terminal redefines the function or the false address information Rm.

The probability to generate the false positive differs depending on a function value generated by the function. The function value is configured into one bit array including a predetermined number of bits. Here, the false positive probability is lowered when the size of the bit array is larger and/or when a less number of elements is included in the function. For the hash functions configuring the function, the probability to generate the false positive is lowered until the function value increases up to a predetermined level, but is raised when the function value exceeds the predetermined level. In addition, a cost of performing the hash functions should be considered. The transmitting terminal redefines the function and/or the false address information by considering the aforementioned factors.

When the false positive is not generated, the function is effective and thus the transmitting terminal and the plurality of receiving terminals store the function. Each of the receiving terminals calculates a function value by inputting its own true address information to the function and stores the calculated function value. For example, when the function is 'BF( )' a first receiving terminal calculates 'BF(I1)' and stores the calculated function value bfid.

The function value bfid is configured into one bit array including a predetermined number of bits. A size of the function value (or the number of bits included in the bit array) may differ according to a length of an address field defined in a data packet corresponding to the message. The length of the address field used at the link layer is differently defined according to a communication type. Since the function value is inserted into address field, the size of the function value differs depending on the communication type.

Meanwhile, the minimum number of elements constructing a predetermined set is defined. In other words, the minimum number of information to be inserted into the function is defined. Hereinafter, the minimum number is referred to as 'q.' The number of false address information inserted into the function varies according to the minimum number.

When the false address information, the function and the minimum number are defined, the transmitting terminal and the receiving terminal are arranged under a network environment. In this instance, the transmitting terminal stores the true address information, the false address information, the function and the minimum number, and each of the receiving terminals stores its own true address information and the function.

Hereinafter, a method of hiding receiver information regarding a message receiver using the true address information and the false address information will be described in detail with reference to FIG. 2.

FIG. 2 is a flowchart illustrating a representative method of hiding receiver information in a system according to the present invention, FIG. 3 is an exemplary view illustrating one embodiment employing the receiver information hiding method of FIG. 2, and FIG. 4 is an exemplary view of applying the receiver information hiding method of FIG. 2 to a ZigBee link layer message format. The communication step will be described in detail with reference to FIGS. 2 to 4.

When the terminals are arranged in the network environment, a situation that the transmitting terminal has to transfer a control command, namely, a message to at least one of the receiving terminals. In this instance, the transmitting terminal selects the at least one receiving terminal that has to receive the message (S110).

Those terminals are arranged with being spaced from one another, and transmit or receive messages using wireless communications. To enable such communications, each of the terminals is provided with a wireless communication unit. The wireless communication units mutually transmit and receive wireless signals through communication networks which are constructed according to technology standards or communication methods for wireless communications.

The wireless communication unit uses at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi direct, Wireless LAN (WLAN), Digital Living Network Alliance (DLNA), Wireless Broadband (WiBro), Worldwide Interoperability for Microwave Access (WiMAX), High Speed Downlink Packet Access (HSDPA), Long Term Evolution (LTE).

The transmitting terminal may select the at least one receiving terminal in various manners according to a message-generated time point, a type of the message, and the like.

Next, the transmitting terminal transforms address information of the selected receiving terminal (S120).

In more detail, the transmitting terminal transforms the address information of the selected receiving terminal using the function defined in the preparation step.

As one example, the transformed address information may be acquired by inserting true address information of the selected receiving terminal into the function. For example, when performing one-to-one communication with one receiving terminal, the transmitting terminal acquires the transformed address information by inserting true address information corresponding to the one receiving terminal into the function. On the other hand, when performing one-to-many communication with a multitude of receiving terminals, the transmitting terminal acquires the transformed address information by inserting a plurality of true address information corresponding to the plurality of receiving terminals into the function.

As another example, the transmitting terminal may acquire the transformed address information by inserting the true address information of the selected receiving terminal and at least one false address information into the function. In more detail, the transmitting terminal may randomly select at least one false address information from the plurality of false address information, and acquire the transformed address information by inserting the selected false address information as well as the true address information of the selected receiving terminal into the function. This is to hide the true address information using the false address information.

When a number of receiving terminals selected is p, the value p is '1' for the one-to-one communication, and corresponds to the number of the selected receiving terminals for the one-to-many communication. In this instance, the number of the true address information inserted into the function may be the value p.

In addition, the transmitting terminal inserts the false address information as many as a value 'q-p' into the function for randomness of the receiver information included in the message. When the values p and q are the same or the value p is greater than the value q, at least one false address information is inserted into the function. That is, q different address information or p+1 different address information may be inserted into the function, thereby generating the transformed address information.

FIG. 3 illustrates an example in which the value q is 5 and message receivers are I2, I4 and I9. In this instance, since the value p is 3, totally two false address information are inserted into the function. Here, the false address information is randomly extracted from a predefined plurality of false address information R1 to Rm. FIG. 3 does not illustrate arrows of I4 and R2, but the arrows of I4 and R2 are inserted into three points, respectively, in the same manner.

Next, the transmitting terminal generates the message using the transformed address information, and broadcasts the generated message (S130).

The transmitting terminal inserts the transformed address information into an address field of the message, and broadcasts the message with the transformed address information inserted therein. Since the result of the function according to an input element does not change, when the transmitting terminal has a sufficient storage space, the transmitting terminal can calculate the result of the function in advance with respect to each receiver and store the previously calculated results. In this instance, the transmitting terminal may acquire the transformed address information by performing a bit-or operation with respect to the previously-calculated performance results of the function, without performing the function every time.

FIG. 4 illustrates the ZigBee link layer message format. In general, message formats are predefined in communication technologies. A header of the message includes information related to a receiver which has to receive the message. A portion where the receiver information is input may be referred to as an address field defined in a data packet. The term designating the address field or a size of a bit array inserted in the address field may differ according to a type of communication technology. Therefore, in the receiver information hiding method according to the present invention, the function value of the function corresponds to the size of the bit array.

Hereinafter, a value inserted into the address field is referred to as an address. The transformed address information is inserted into the address field.

Next, upon the reception of the message, each of the receiving terminals determines whether or not it is included in the selected receiving terminal using specific address information corresponding to each of the receiving terminals and the transformed address information, and selectively processes or ignores the message according to the determination result.

Each of the receiving terminals receives the message broadcasted by the transmitting terminal. In response to the reception of the message, each of the receiving terminals determines whether or not it is included as an element (i.e., performs the membership query) using the address included in the address field of the message. That is, each of the receiving terminals determines whether or not to execute a function corresponding to the message.

In detail, each of the receiving terminals determines whether or not its own true address information is included in the address. That is, each of the receiving terminals determines whether or not it is included in the selected receiving terminal using the bloom filter. For example, the first receiving terminal determines whether or not the first true address information is included in the address, and the $n^{th}$ receiving terminal determines whether or not the $n^{th}$ true address information is included in the address.

Each of the receiving terminals performs the function corresponding to the message when it is included in the selected receiving terminal, while ignoring the message when it is not included in the selected receiving terminal. For example, when the receiving terminals receive the message illustrated in FIG. 4, the second, fourth and ninth receiving terminals (I2, I4 and I9) execute the function corresponding to the message, and the other receiving terminals do not execute the function. That is, the other receiving terminals ignore the message and do not execute the function.

Meanwhile, the receiving terminals as well as the transmitting terminal can transmit messages to other receiving terminals using the same method used by the transmitting terminal by hiding receiver information, in case where they know each true address information of the other receiving terminals.

Figure 5:
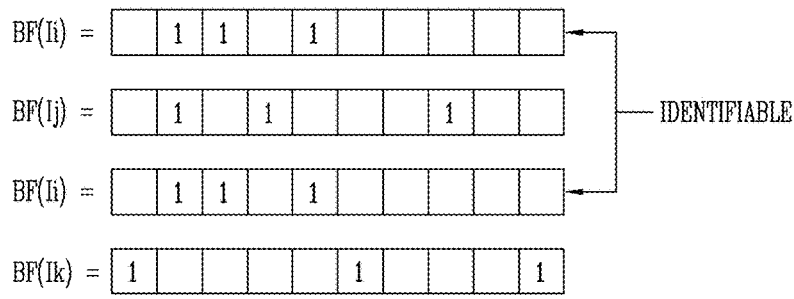
FIG. 5 is an exemplary view of obtaining the same bloom filter value with respect to the same receiver.

FIG. 5 is an exemplary view of obtaining the same bloom filter value with respect to the same receiver. As illustrated in FIG. 5, it can be noticed that the same function value is generated when the same address information Ii is input into the function.

Figure 6:
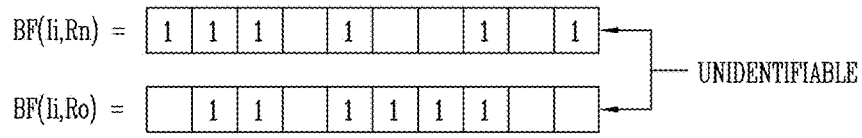
FIG. 6 is an exemplary view of solving the problem of FIG. 5 in a manner of acquiring different bloom filter values with respect to the same receiver by inserting unintentional virtual receiver information.

FIG. 6 is an exemplary view of solving the problem of FIG. 5 in a manner of acquiring a different bloom filter value with respect to the same receiver by inserting a random virtual receiver information. FIG. 6 exemplarily illustrates an example that at least one false address information as well as true address information is inserted into the function. As at least one false address information randomly selected from a plurality of false address information is input into the function, a different function value can be generated, and receiver information of a message heading for the same receiver can be hidden. That is, it cannot be identified who the receiver is.

Figure 7:
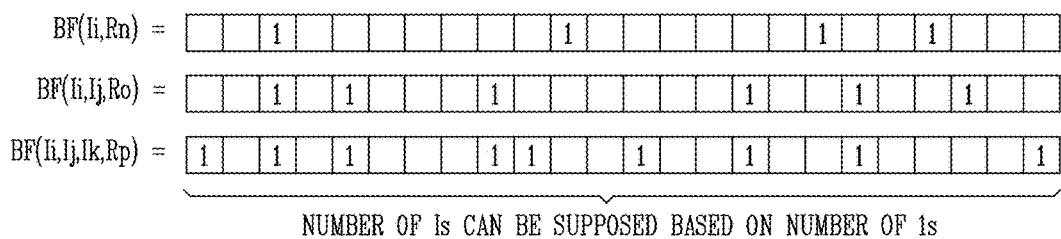
FIG. 7 is an exemplary view of setting a number of value within receiver information according to a number of receivers.

FIG. 7 is an exemplary view illustrating that a number of value within receiver information is designated (set) according to a number of receivers. The number of value is approximately designated in the function value generated by the function according to a number of variables input into the function. For example, in case where t hash functions (i.e., hash functions as many as t) are included in the function, when one true address information and one false address information are inserted into the function to perform one-to-one communication, the value '1' which is as many as 2t is included in the function value. When two true address information and one false address information are inserted into the function for one-to-many communication, the value '1' which is as many as 3t is included in the function value. In this instance, a third party can identify the number of receiving terminals which have to receive the message.

Figure 8:
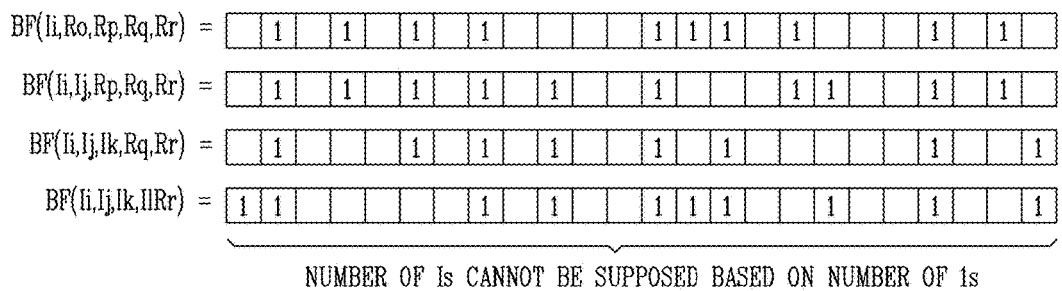
FIG. 8 is an exemplary view of solving the problem of FIG. 7 in a manner of preventing a number of receiving terminals having to receive a message from being recognized by setting a minimum number of variables which should be input to a function.

FIG. 8 is an exemplary view of solving the problem of FIG. 7 in a manner of preventing a recognition of a number of receiving terminals that have to receive the message by setting a minimum number of variables which should be input into a function.

As aforementioned, the receiver information hiding method according to the present invention sets the minimal number of variables to be inserted into the function. For example, in case where the minimum number is set to 5, when one true address information is selected, four of the false address information are randomly selected. As another example, when two of the true address information are selected, three of the false address information are randomly selected.

Accordingly, the receiving terminal can identify whether or not the received message should be processed by itself, but a third party cannot identify which one is the receiving terminal of the message or how many receiving terminals receive the message.

The foregoing description has been given based on the wireless sensor network but the same bloom filter address can be used even in the conventional wired/wireless network in a manner of adding the following processes.

A) Wireless Network—Infrastructure

An infrastructure wireless network is a network of including an access point (AP) and allowing every wireless terminal to perform communications with other terminals through the access point. From the perspective of the link layer, the access point performs a function similar to a base station of the wireless sensor network. The access point generates the bloom filter address using information related to a terminal connected thereto and performs communications using the generated bloom filter address.

B) Wireless Network—Ad-Hoc

A wireless Ad-hoc network is a network of allowing every terminal to directly perform communications without using an access point. Without a central terminal such as the base station, each terminal should collect information related to an adjacent terminal and generate a bloom filter address.

C) Wired Network—Bus

A bus-type wired network is a type of network on which several terminals share one line. Similar to the wireless Ad-hoc network, each terminal should collect information related to a terminal connected to the line and generate the bloom filter address.

The technology proposed in the present invention can provide the following security effects.

Since the same result is generated when the same true address information I is input into a function BF( ), an attacker can know that a corresponding message is transferred to the same receiver. The result of the function BF( ) is differently generated per each time by always inputting a value randomly selected from a set R, which may prevent the attacker from identifying the message heading for the same receiver.

A number of value within the results of the function BF( ) is approximately set according to a number of values input to the function BF( ) When one true address information I and one false address information R are inserted into the function BF( ) for unicast, the value '1' which is as many as about 2m may be set accordingly. When two true address information Is and one false address information R are inserted into the function BF( ) the value '1' which is as many as about 3m may be set accordingly. This may allow the attacker to identify whether the corresponding message is a unicasted message or a multicasted message. The present invention may be configured to input values as many as at least q into the function BF( ) which may prevent identification of unicast and q−1 multicasts.

The present invention can be implemented as computer-readable codes in a program-recorded medium. The computer-readable medium may include all types of recording devices that can store data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for hiding receiver information, in a receiver information hiding method of hiding receiver information of a message in a system comprising a transmitting terminal broadcasting the message and a multitude of receiving terminals receiving the message, the method comprising:
selecting by the transmitting terminal at least one receiving terminal that has to process the message from the plurality of terminals;
transforming by the transmitting terminal address information regarding the selected at least one receiving terminal;
generating by the transmitting terminal the message using the transformed address information and broadcasting the generated message; and
determining by each of the plurality of receiving terminals whether or not the corresponding receiving terminal is included in the selected at least one receiving terminal using specific address information corresponding to each of the plurality of receiving terminals and the transformed address information, in response to the reception of the message, and selectively processing or ignoring the message according to the determination result,
wherein the transforming by the transmitting terminal of the address information regarding the selected at least one receiving terminal comprises:
defining a function for transforming the address information regarding the selected at least one receiving terminal, wherein the function is a function of generating a probabilistic data structure to determine whether or not a specific element is included in a predetermined set; and
acquiring the transformed address information by inserting the address information regarding the selected at least one receiving terminal and at least one false address information into the function.

2. The method of claim 1, wherein the transforming by the transmitting terminal the address information regarding the selected at least one receiving terminal further comprises:
defining a plurality of false address information having different values, respectively, wherein the plurality of false address information are defined in a manner of avoiding duplication with address information corresponding to each of the plurality of receiving terminals; and
randomly selecting at least one of the plurality of false address information,
wherein the selected at least one false address information is inserted into the function in the step of acquiring the transformed address information.

3. The method of claim 2, wherein a number of the selected false address information differs according to a number of the selected receiving terminal.

4. The method of claim 1, wherein a size of the probabilistic data structure differs according to a length of an address field defined in a data packet corresponding to the message.

5. The method of claim 1, wherein a bloom filter is generated by the function.

6. The method of claim 5, wherein the processing or ignoring the message comprises:
determining by each of the plurality of receiving terminals whether or not the corresponding receiving terminal is included in the selected receiving terminal; and
processing by each of the plurality of receiving terminals the message when the corresponding receiving terminal is included in the selected receiving terminal, and ignoring the message when not included in the selected receiving terminal.

7. The method of claim 1, wherein the address information regarding the selected receiving terminal includes at least one of a link layer address, and a unique serial number of the selected receiving terminal.

8. A method for hiding receiver information, in a receiver information hiding method of hiding receiver information of a message in a system comprising a transmitting terminal broadcasting the message and a multitude of receiving terminals receiving the message, the method comprising:
defining different true address information with respect to each of the plurality of receiving terminals, respectively, and false address information without being duplicated with the true address information;
defining a function using the true address information and the false address information, wherein the function is a function of generating a probabilistic data structure to determine whether or not a specific element is included in a predetermined set;
selecting at least one receiving terminal that has to receive the message from the plurality of receiving terminals;
randomly selecting at least one false address information from the defined false address information, wherein a number of the selected false address information differs according to a number of the selected receiving terminal;
generating receiver information of the message by inputting the true address information corresponding to the selected receiving terminal and the selected false address information into the function; and
broadcasting the message using the generated receiver information.

* * * * *